United States Patent
Kobayashi et al.

(10) Patent No.: US 11,827,199 B2
(45) Date of Patent: Nov. 28, 2023

(54) VEHICLE BRAKE DEVICE

(71) Applicant: ADVICS CO., LTD., Kariya (JP)

(72) Inventors: Tatsushi Kobayashi, Kariya (JP);
Tomotaka Asano, Toyota (JP);
Yasuhito Ishida, Toyokawa (JP);
Ryosuke Endo, Nagoya (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 587 days.

(21) Appl. No.: 16/759,381

(22) PCT Filed: Nov. 6, 2018

(86) PCT No.: PCT/JP2018/041113
§ 371 (c)(1),
(2) Date: Apr. 27, 2020

(87) PCT Pub. No.: WO2019/088296
PCT Pub. Date: May 9, 2019

(65) Prior Publication Data
US 2020/0290576 A1   Sep. 17, 2020

(30) Foreign Application Priority Data

Nov. 6, 2017   (JP) .................................. 2017-213856

(51) Int. Cl.
*B60T 8/40*       (2006.01)
*B60T 8/171*      (2006.01)
(Continued)

(52) U.S. Cl.
CPC .............. *B60T 8/171* (2013.01); *B60T 8/409* (2013.01); *B60T 13/686* (2013.01);
(Continued)

(58) Field of Classification Search
CPC .. B60T 15/028; B60T 2201/03; B60T 8/4081; B60T 8/409; B60T 8/171;
(Continued)

(56) References Cited

U.S. PATENT DOCUMENTS 7,748,794 B2 *  7/2010  Tsunehara ............. B60T 8/4081
                                                                303/155
9,663,082 B2 *  5/2017  Drumm ................... B60T 7/042
(Continued)

FOREIGN PATENT DOCUMENTS

| JP | 2015-136957 A | 7/2015 | |
|---|---|---|---|
| JP | 2016153257 A * | 8/2016 | ............. B60T 17/18 |
| WO | WO-2016132865 A1 * | 8/2016 | ............. B60T 17/18 |

*Primary Examiner* — Bradley T King
(74) *Attorney, Agent, or Firm* — Oblon, McClelland, Maier & Neustadt, L.L.P.

(57) ABSTRACT

A vehicle brake device includes a stroke simulator, a stroke sensor, and a brake start determination unit. The stroke simulator includes a cylinder, a piston, an orifice, and a pressure sensor. The cylinder defines a liquid pressure chamber to which a brake liquid is supplied via a fluid path. The piston slides in the cylinder by the brake liquid supplied to the liquid pressure chamber. The orifice is formed in the fluid path. The pressure sensor detects a reaction pressure. The stroke sensor is configured to detect the stroke. The brake start determination unit determines an operation of the brake operation member has been started in a case where the reaction pressure detected by the pressure sensor becomes equal to or greater than a first threshold value and the stroke detected by the stroke sensor becomes equal to or greater than a second threshold value.

10 Claims, 3 Drawing Sheets

(51) Int. Cl.
  *B60T 13/68*  (2006.01)
  *B60T 17/22*  (2006.01)
  *B60T 7/04*   (2006.01)
(52) U.S. Cl.
  CPC ............ *B60T 17/221* (2013.01); *B60T 7/042* (2013.01); *B60T 2270/82* (2013.01); *B60T 2270/88* (2013.01)
(58) Field of Classification Search
  CPC .. B60T 2220/04; B60T 7/042; B60T 2270/82; B60T 2270/88
  See application file for complete search history.

(56) References Cited

U.S. PATENT DOCUMENTS

| | | | | |
|---|---|---|---|---|
| 9,802,592 | B2* | 10/2017 | Okano | B60T 8/34 |
| 10,046,749 | B2* | 8/2018 | Irwan | B60T 13/745 |
| 10,144,404 | B2* | 12/2018 | Irwan | B60T 7/042 |
| 2010/0179740 | A1* | 7/2010 | Lubbers | B60T 7/042 |
| | | | | 701/70 |
| 2013/0218407 | A1* | 8/2013 | Jungbecker | B60T 13/662 |
| | | | | 701/34.4 |
| 2015/0066321 | A1* | 3/2015 | Brubaker | B60T 7/02 |
| | | | | 701/70 |
| 2015/0158471 | A1* | 6/2015 | Ezoe | B60T 7/22 |
| | | | | 701/70 |
| 2016/0009385 | A1* | 1/2016 | Van Deventer | B60T 8/17613 |
| | | | | 701/71 |
| 2016/0325720 | A1 | 11/2016 | Akahane et al. | |
| 2017/0267218 | A1* | 9/2017 | Bunk | B60T 13/745 |
| 2017/0274879 | A1* | 9/2017 | Okochi | B60T 8/4081 |
| 2017/0320474 | A1* | 11/2017 | Svensson | B60T 17/02 |
| 2018/0029576 | A1* | 2/2018 | Kobayashi | B60T 8/48 |
| 2018/0099649 | A1* | 4/2018 | Kim | B60T 13/686 |
| 2021/0179040 | A1* | 6/2021 | Hwang | B60T 13/142 |
| 2021/0197842 | A1* | 7/2021 | Michaelsen | B60W 10/04 |

* cited by examiner

VEHICLE BRAKE DEVICE

TECHNICAL FIELD

The present disclosure relates to a vehicle brake device.

BACKGROUND ART

As disclosed in JP-A-2015-136957, there is a vehicle brake device configured to determine a brake situation to determine whether a sudden brake operation has been performed. Also, the vehicle brake device is configured to determine whether a brake operation member has been started, so as to appropriately start a brake control, separately from the determination of the brake situation. As an example, the vehicle brake device is configured to determine whether an operation of the brake operation member has been started, based on a detection value of a stroke sensor configured to detect a stroke of the brake operation member. Here, when it is determined as "brake start (operation start)", pressurization control on a wheel cylinder is started.

CITATION LIST

Patent Literature

PTL 1: JP-A-2015-136957

BRIEF SUMMARY

Technical Problem

In the vehicle brake device, the stroke (detection value) responds almost similarly to a usual gentle brake operation. However, for the sudden brake operation, an increase in stroke (detection value) tends to be delayed from the operation, due to performance of the stroke sensor. Therefore, when detecting the sudden brake operation, it is considered to use a detection value of a brake switch so as to improve responsiveness of the brake start determination.

However, the brake switch does not respond unless the brake pedal is depressed to some extent, due to its configuration. That is, the brake switch is effective in detection of sudden brake that is quickly depressed to the end for a sudden stop but is difficult to respond to a small amount of sudden operation that is a slight sudden operation (for example, an operation in which the brake pedal is quickly depressed halfway and then stopped or released). Therefore, upon the small amount of sudden operation, the brake start determination is performed only by the stroke of which response tends to be delayed. Thus, there is room for improvement in responsiveness of the brake start determination upon the small amount of sudden operation in which the brake pedal is quickly depressed slightly.

The present disclosure has been made in view of the above situations, and an object thereof is to provide a vehicle brake device capable or improving responsiveness of brake start determination upon a small amount of sudden operation while securing accuracy of the determination.

Solution to Problem

The present disclosure provides a vehicle brake device. The vehicle brake device includes a stroke simulator, a stroke sensor, a brake start determination unit. The stroke simulator includes a cylinder, a piston, an orifice, and a pressure sensor. The cylinder defines a liquid pressure chamber to which a brake liquid is supplied via a path in accordance with a stroke of a brake operation member. The piston is configured to slide in the cylinder by the brake liquid supplied to the liquid pressure chamber. The orifice is formed in the fluid path. The pressure sensor is configured to detect a reaction pressure that is a liquid pressure of the brake liquid supplied to the liquid pressure chamber in a part on a supply-direction upstream side of the orifice in the fluid path. A reaction force corresponds to the reaction pressure being applied to the brake operation member by the stroke simulator. The stroke sensor is configured to detect the stroke. The brake start determination unit determines an operation of the brake operation member has been started in a case where the reaction pressure detected by the pressure sensor becomes equal to or greater than a first threshold value and the stroke detected by the stroke sensor becomes equal to or greater than a second threshold value.

Advantageous Effects

According to the present disclosure, when a sudden brake operation (including a small amount of sudden operation.) has been performed, the reaction pressure is likely to increase due to the orifice. According to the present disclosure, the reaction pressure is used as an element of the brake start determination, so that even upon a small amount of sudden operation to which a brake switch does not respond, for example, it is possible to improve responsiveness of the brake start determination. Also, the stroke is used as an element of the brake start determination, together with the reaction pressure, so that it is possible to secure accuracy of the determination. Regarding the detection of the stroke, the determination is performed under an AND condition with the reaction pressure, so that the responsiveness can be prioritized over the accuracy.

DESCRIPTION OF EMBODIMENTS

Figure 1:
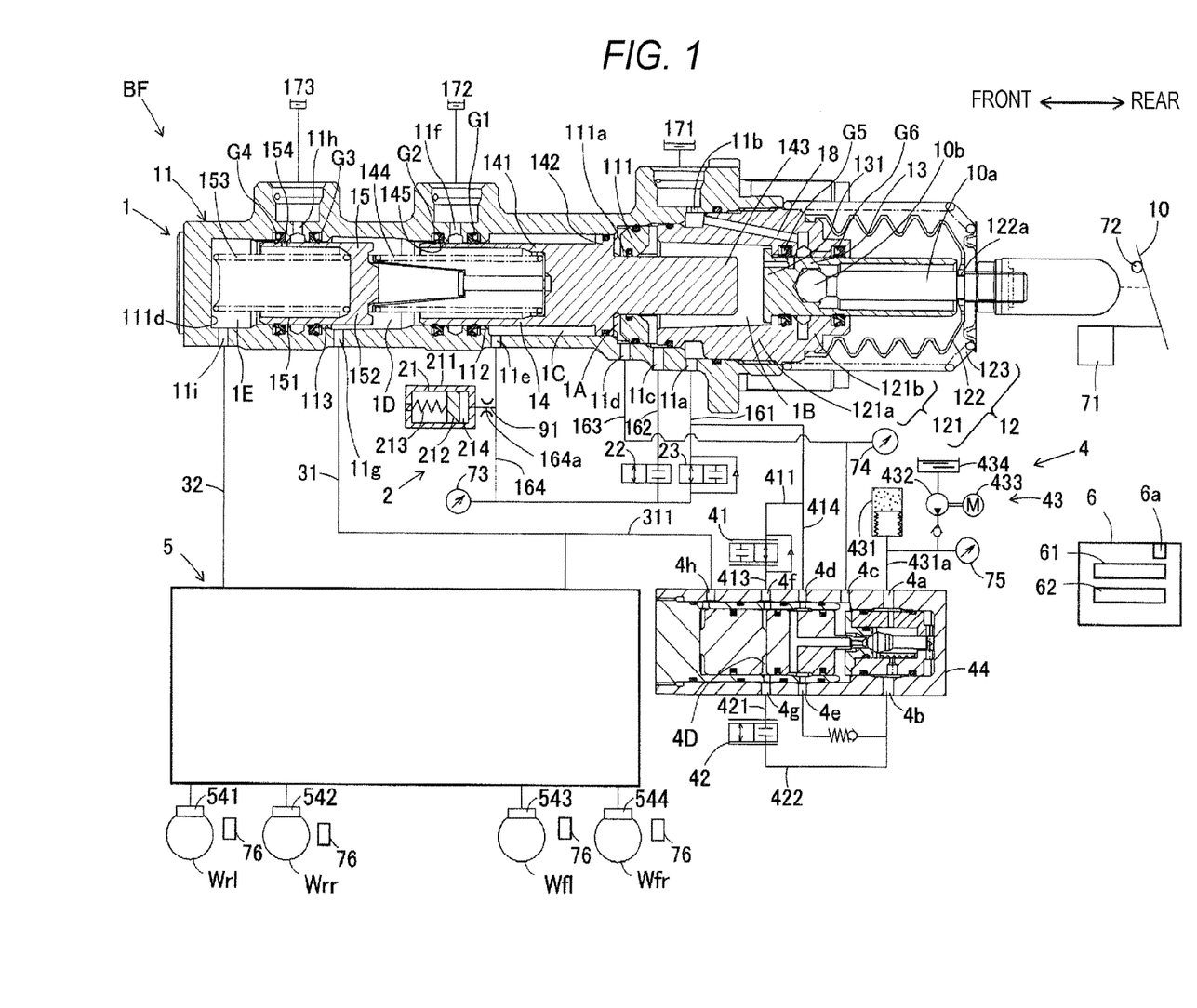
FIG. 1 is a configuration view of a vehicle brake device of the present embodiment.

Hereinbelow, embodiments of the present disclosure will be described with reference to the drawings. The drawings used for descriptions are conceptual views, and shapes respective parts may not be strictly exact. As shown in FIG. 1, a vehicle brake device BF includes a master cylinder 1, a reaction force generation device 2, a first control valve 22, a second control valve 23, a servo pressure generation device 4, an actuator 5, wheel cylinders 541 to 544, a brake ECU 6, and a variety of sensors 71 to 76.

The master cylinder 1 is a part configured to supply a brake liquid to the actuator 5, in accordance with an operation amount on a brake pedal (corresponding to "brake operation member") 10, and has a main cylinder 11, a cover cylinder 12, an input piston 13, a first master piston 14, and a second master piston 15. The brake pedal 10 may be any brake operating means with which a driver can perform a brake operation.

The main cylinder 11 is a substantially cylindrical bottomed housing of which front is closed and rear is opened.

An inner wall part 111 protruding in an inwardly directed flange shape is provided in the vicinity of the rear on an inner periphery side of the main cylinder 11. A center of the inner wall part 111 is formed as a through-hole 111a penetrating in a front and rear direction. Also, small-diameter parts 112 (rear) and 113 (front) of which inner diameters are slightly small are provided in front of the inner wall part 111 in the main cylinder 11. That is, the small-diameter parts 112 and 113 protrude in an annular shape inwardly from an inner peripheral surface of the main cylinder 11. In the main cylinder 11, the first master piston 14 is disposed so as to be axially movable in sliding contact with the small-diameter part 112. Likewise, the second master piston 15 is disposed so as to be axially movable in sliding contact with the small-diameter part 113.

The cover cylinder 12 is configured by a substantially cylindrical cylinder part 121, a bellows tube-shaped boot 122, and a cup-shaped compression spring 123. The cylinder part 121 is disposed on a rear end side of the main cylinder 11, and is coaxially fitted in an opening on a rear side of the main cylinder 11. An inner diameter of a front portion 121a of the cylinder part 121 is larger than an inner diameter of the through-hole 111a of the inner wall part 111. Also, an inner diameter of a rear portion 121b of the cylinder part 121 is smaller than the inner diameter of the front portion 121a.

The dust-proof boot 122 can be expanded and contracted in a bellows tube shape in the front and rear direction, and is attached on its front side so as to contact an opening on a rear end side of the cylinder part 121. A through-hole 122a is formed at a rear center of the boot 122. The compression spring 123 is a coil shaped urging spring disposed around the boot 122, and a front side thereof is in contact with a rear end of the main cylinder 11 and a rear side is radially reduced so as to come close to the through-hole 122a of the boot 122. A rear end of the boot 122 and a rear end of the compression spring 123 are coupled to an operation rod 10a. The compression spring 123 urges rearward the operation rod 10a.

The input piston 13 is a piston configured to slide in the cover cylinder 12 in accordance with an operation of the brake pedal 10. The input piston 13 is a substantially cylindrical bottomed piston having a bottom surface at the front and an opening at the rear. A bottom wall 131 configuring the bottom surface of the input piston 13 has a larger diameter than other part of the input piston 13. The input piston 13 is liquid-tightly disposed so as to be axially slidable in the rear portion 121b of the cylinder part 121, and the bottom wall 131 is disposed on an inner periphery side of the front portion 121a of the cylinder part 121.

In the input piston 13, the operation rod 10a configured to operate in conjunction with the brake pedal 10 is disposed. A pivot 10b at a tip end of the operation rod 10a is adapted to push and move forward the input piston 13. A rear end of the operation rod 10a protrudes outward through the opening on the rear side of the input piston 13 and the through-hole 122a of the boot 122, and is connected to the brake pedal 10. When the brake pedal 10 is depressed, the operation rod 10a is advanced while pushing and moving axially the boot 122 and the compression spring 123. The input piston 13 is also advanced in conjunction with the advance of the operation rod 10a.

The first master piston 14 is disposed to be axially slidable on the inner wall part 111 of the main cylinder 11. The first master piston 14 has a pressurizing cylindrical part 141, a flange part 142, and a protrusion 143, which are integrally formed sequentially from the front side. The pressurizing cylindrical part 141 is formed into a substantially cylindrical bottomed shape having an opening at the front, has a gap with the inner peripheral surface of the main cylinder 11, and is in sliding contact with the small-diameter part 112. In an inside space of the pressurizing cylindrical part 141, a coil-shaped urging member 144 is disposed between the pressurizing cylindrical part and the second master piston 15. The urging member 144 urges rearward the first master piston 14. In other words, the first master piston 14 is urged toward a set initial position by the urging member 144.

The flange part 142 has a larger diameter than the pressurizing cylindrical part 141, and is in sliding contact with the inner peripheral surface of the main cylinder 11. The protrusion 143 has a smaller diameter than the flange part 142, and is liquid-tightly disposed to be slidable in the through-hole 111a of the inner wall part 111. A rear end of the protrusion 143 protrudes into an inside space of the cylinder part 121 beyond the through-hole 111a, and is spaced from an inner peripheral surface of the cylinder part 121. A rear end face of the protrusion 143 is spaced from the bottom wall 131 of the input piston 13, and a spacing distance thereof can be varied.

Herein, a "first master chamber 1D" is defined by the inner peripheral surface of the main cylinder 11, a front side of the pressurizing cylindrical part 141 of the first master piston 14, and a rear side of the second master piston 15. Also, a rear chamber is defined at the rear of the first master chamber 1D by the inner peripheral surface (inner peripheral part) of the main cylinder 11, the small-diameter part 112, a front surface of the inner wall part 111, and an outer peripheral surface of the first master piston 14. A front end portion and a rear end portion of the flange part 142 of the first master piston 14 divide the rear chamber into front and rear, so that a "second liquid pressure chamber 1C" is formed on the front side and a "servo chamber 1A" is formed on the rear side. A volume of the second liquid pressure chamber 1C decreases as the first master piston 14 is advanced, and increases as the first master piston 14 is retreated. Also, a "first liquid pressure chamber 1B" is defined by the inner peripheral part of the main cylinder 11, a rear surface of the inner wall part 111, an inner peripheral surface (inner peripheral part) of the front portion 121a of the cylinder part 121, the protrusion 143 (rear end portion) of the first master piston 14, and a front end portion of the input piston 13.

The second master piston 15 is disposed to be axially movable in sliding contact with the small-diameter part 113 on a front side of the first master piston 14 in the main cylinder 11. The second master piston 15 is formed integrally with a tubular pressurizing cylindrical part 151 having an opening at the front, and a bottom wall 152 formed to close a rear side of the pressurizing cylindrical part 151. The bottom wall 152 supports the urging member 144 between the bottom wall and the first master piston 14. In an inside space of the pressurizing cylindrical part 151, a coil-shaped urging member 153 is disposed between the pressurizing cylindrical part and a closed inner bottom surface hid of the main cylinder 11. The urging member 153 urges rearward the second master piston 15. In other words, the second master piston 15 is urged toward a set initial position by the urging member 153. A "second master chamber 1E" is defined by the inner peripheral surface and the inner bottom surface 111d of the main cylinder 11 and the second master piston 15.

The master cylinder 1 is formed with ports 11a to 11i for communicating an inside and an outside of the master cylinder each other. The port 11a is formed at the rear of the inner wall part 111 of the main cylinder 11. The port 11b is formed to face the port 11a, in an axially similar position to the port 11a. The port 11a and the port 11b communicate with each other via an annular space between the inner peripheral surface of the main cylinder 11 and an outer peripheral surface of the cylinder part 121. The port 11a and the port 11b connect to a pipe 161 and also to a reservoir 171 (low-pressure source).

Also, the port 11b communicates with the first liquid pressure chamber 1B by a passage 18 formed in the cylinder part 121 and the input piston 13. The passage 18 is formed so that it is blocked when the input piston 13 is advanced. Thereby, the first liquid pressure chamber 1B and the reservoir 171 are cut off each other. The port 11c is formed at the rear of the inner wall part 111 and in front of the port 11a, and communicates the first liquid pressure chamber 1B and a pipe 162 each other. The port 11d is formed in front of the port 11c, and communicates the servo chamber 1A and a pipe 163 each other. The port 11e is formed in front of the port 11d, and communicates the second liquid pressure chamber 1C and a pipe 164 each other.

The port 11f is formed between both seal members G1 and G2 of the small-diameter part 112, and communicates a reservoir 172 and the inside of the main cylinder 11 each other. The port 11f communicates with the first master chamber 1D via a passage 145 formed in the first master piston 14. The passage 145 is formed in a position in which the port 11f and the first master chamber 1D are cut off when the first master piston 14 is advanced. The port 11g is formed in front of the port 11f, and communicates the first master chamber 1D and a pipe conduit 31 each other.

The port 11h is formed between both seal members G3 and G4 of the small-diameter part 113, and communicates a reservoir 173 and the inside of the main cylinder 11 each other. The port 11h communicates with the second master chamber 1E via a passage 154 formed in the pressurizing cylindrical part 151 of the second master piston 15. The passage 154 is formed in a position in which the port 11h and the second master chamber 1E are cut off when the second master piston 15 is advanced. The port 11i is formed in front of the port 11h, and communicates the second master chamber 1E and a pipe conduit 32 each other.

Also, a seal member such as an O-ring is appropriately disposed in the master cylinder 1. The seal members G1 and G2 are disposed at the small-diameter part 112, and are in liquid-tight contact with the outer peripheral surface of the first master piston 14. Likewise, the seal members G3 and G4 are disposed at the small-diameter part 113, and are in liquid-tight contact with the outer peripheral surface of the second master piston 15. Also, seal members G5 and G6 are disposed between the input piston 13 and the cylinder part 121.

A stroke sensor 71 is a sensor configured to detect a stroke (operation amount) of the brake pedal 10 made by a driver's operation, and is configured to transmit a detection signal to the brake ECU 6. A brake switch 72 is a switch configured to detect whether or not a driver operates the brake pedal 10 by a binary signal, and is configured to transmit a detection signal to the brake ECU 6. The brake switch 72 is also referred to as a brake stop switch.

The reaction force generation device 2 is a device configured to generate a reaction force that opposes an operation force when the brake pedal 10 is operated, and mainly includes a stroke simulator 21. The stroke simulator 21 is configured to generate a reaction pressure in the first liquid pressure chamber 1B and the second liquid pressure chamber 1C, in accordance with an operation of the brake pedal 10. The stroke simulator 21 has a configuration where a piston 212 is slidably fitted in a cylinder 211. The piston 212 is urged rearward by a compression spring 213, and a reaction chamber (corresponding to "liquid pressure chamber") 214 is formed on a rear surface-side of the piston 212 (the pipe 164-side). The reaction chamber 214 is connected to the second liquid pressure chamber 1C via the pipe 164 and the port 11e, and the reaction chamber 214 is connected to the first control valve 22 and the second control valve 23 via the pipe 164.

A branched pipe part 164a that is a part of the pipe 164 and is disposed in the vicinity of an inlet of the cylinder 211 is formed with an orifice 91. The pressure sensor 73 is disposed at a part of the pipe 164 on an upstream side of the orifice 91 (an upstream side with respect to flow of a brake liquid upon depression). That is, the pressure sensor 73 is a sensor configured to detect a reaction pressure that is a liquid pressure in a part (upstream part) of the pipe 164 on a side closer to the brake pedal 10 than the orifice 91.

Like this, it can be said that the stroke simulator 21 has the cylinder 211 configured to define the reaction chamber 214 to which a brake liquid is supplied via the pipe (corresponding to "fluid path") 164 in accordance with a stroke of the brake pedal 10, the piston 212 configured to slide in the cylinder 211 by the brake liquid supplied to the reaction chamber 214, the orifice 91 provided in the branched pipe part 164a that is a part of the pipe 164, and the pressure sensor 73 configured to detect a liquid pressure (reaction pressure) of the brake liquid supplied to the reaction chamber 214 in a part of the piper 164 on the supply-direction upstream side of the orifice 91. The stroke simulator 21 is configured to apply a reaction force corresponding to the reaction pressure to the brake pedal 10.

The first control valve 22 is an electromagnetic valve that closed in a non-energization state, and opening/closing thereof is controlled by the brake ECU 6. The first control valve 22 is connected between the pipe 164 and the pipe 162. Herein, the pipe 164 communicates with the second liquid pressure chamber 1C via the port 11e, and the pipe 162 communicates with the first liquid pressure chamber 1B via the port 11c. Also, when the first control valve 22 is opened, the first liquid pressure chamber 1B is opened, and when the first control valve 22 is closed, the first liquid pressure chamber 1B is closed. Therefore, the pipe 164 and the pipe 162 are provided to communicate the first liquid pressure chamber 1B and the second liquid pressure chamber 1C each other.

The first control valve 22 is closed in the non-energization state. At this time, the first liquid pressure chamber 1B and the second liquid pressure chamber 1C are cut off each other. Thereby, the first liquid pressure chamber 1B is closed, so that there is no place for the brake liquid to flow, and the input piston 13 and the first master piston 14 operate in conjunction with each other while keeping a constant spacing distance. Also, the first control valve 22 is opened in an energization state. At this time, the first liquid pressure chamber 1B and the second liquid pressure chamber 1C communicate with each other. Thereby, a change in volumes of the first liquid pressure chamber 1B and the second liquid pressure chamber 1C as a result of the advance and retreat of the first master piston 14 is absorbed by movement of the brake liquid.

The pressure sensor 73 is a sensor configured to detect reaction pressures in the second liquid pressure chamber 1C and the first liquid pressure chamber 1B, and is connected to the pipe 164. The pressure sensor 73 detects a pressure in the second liquid pressure chamber 1C when the first control valve 22 is in the closed state, and also detects a pressure in the first liquid pressure chamber 1B communicating with the second liquid pressure chamber when the first control valve in the opened state. The pressure sensor 73 is configured to transmit a detection signal to the brake ECU 6.

The second control valve 23 is an electromagnetic valve that is opened in the non-energization state, and opening/closing thereof is controlled by the brake ECU 6. The second control valve 23 is connected between the pipe 164 and the pipe 161. Herein, the pipe 164 communicates with the second liquid pressure chamber 1C via the port 11e, and the 161 communicates with the reservoir 171 via the port 11a. Therefore, the second control valve 23 does not generate the reaction pressure by communicating the second liquid pressure chamber 1C and the reservoir 171 each other in the non-energization state, and generates the reaction pressure by cutting off the same each other in the energization state.

The servo pressure generation device 4 is a so-called hydraulic booster (boosting device), and includes a pressure decreasing valve 41, a pressure increasing valve 42, a pressure supply unit 43, and a regulator 44. The pressure decreasing valve 41 is a normally open electromagnetic valve (normally open valve) that is opened in the non-energization state, and a flow rate (or pressure) thereof is controlled by the brake ECU 6. One side of the pressure decreasing valve 41 connected to the pipe 161 via a pipe 411, and the other side of the pressure decreasing valve 41 is connected to a pipe 413. That is, one side of the pressure decreasing valve 41 communicates with the reservoir 171 via the pipes 411 and 161 and the ports 11a and 11b. When the pressure decreasing valve 41 is closed, the outflow of the brake liquid from a pilot chamber 4D is prevented. In the meantime, the reservoir 171 and a reservoir 434 communicate with each other, although not shown. The reservoir 171 and the reservoir 434 may be the same reservoir.

The pressure increasing valve 42 is a normally closed electromagnetic valve (normally closed valve) that is closed in the non-energization state, and a flow rate (or pressure) thereof is controlled by the brake ECU 6. One side of the pressure increasing valve 42 is connected to a pipe 421, and the other side of the pressure increasing valve 42 is connected to a pipe 422. The pressure supply unit 43 is a unit configured to mainly supply a high-pressure operating fluid to the regulator 44. The pressure supply unit 43 includes an accumulator 431, a liquid pressure pump 432, a motor 433, and the reservoir 434. The pressure sensor 75 is configured to detect a liquid pressure in the accumulator 431. Since the configuration of the pressure supply unit 43 is well known, the description thereof is omitted.

The regulator 44 is a mechanical regulator and has the pilot chamber 4D formed therein. Also, the regulator 44 is formed with a plurality of ports 4a to 4h. The pilot chamber 4D is connected to the pressure decreasing valve 41 via the port 4f and the pipe 413, and is connected to the pressure increasing valve 42 via the port 4g and the pipe 421. When the pressure increasing valve 42 is opened, a high-pressure brake liquid is supplied from the accumulator 431 to the pilot chamber 4D via the ports 4a, 4b and 4g, so that the piston is moved to expand the pilot chamber 4D. In accordance with the expansion, the valve member is moved to communicate the port 4a and the port 4c each other, so that the high-pressure brake liquid is supplied to the servo chamber 1A through the pipe 163. On the other hand, when the pressure decreasing valve 41 is opened, the liquid pressure (pilot pressure) in the pilot chamber 4D is lowered, so that a flow path between the port 4a and the port 4c is cut off by the valve member. In this way, the brake ECU 6 is configured to control the pressure decreasing valve 41 and the pressure increasing valve 42, thereby controlling the pilot pressure corresponding to the servo pressure to control the servo pressure. An actual servo pressure is detected by the pressure sensor 74. The present embodiment has a by-wire configuration in which the brake operating mechanism and the pressure adjusting mechanism are separated from each other.

The actuator 5 is a device configured to adjust a master pressure that is supplied through the pipe conduits 31 and 32 and to supply the same to the wheel cylinders 541 to 544. The actuator 5 is an actuator configuring an ABS, and has a plurality of electromagnetic valves, a motor, a pump, a reservoir, and the like, which are not shown. The actuator 5 can execute a pressure increasing control, a keeping control and a pressure decreasing control for the wheel cylinders 541 to 544 under control of the brake ECU 6. Also, the actuator 5 can execute an antiskid control (ABS control) and the like under control of the brake ECU 6. Also, each wheel W is provided with the wheel speed sensor 76.

Brake Start Determination

The brake ECU 6 is an electronic control unit having a CPU and a memory. The brake ECU 6 is communicatively connected to each of the sensors 71 to 76, each of the control valves 22 and 23, the servo pressure generation device 4, and the actuator 5 (wires are not shown). The brake ECU 6 has, as functional units, a control unit 61, and a brake start determination unit 62. The control unit 61 is configured to calculate a target deceleration (target servo pressure) based on detection values of the stroke sensor 71 and the pressure sensor 73, and to control each of the control valves 22 and 23, the servo pressure generation device 4 and the actuator 5, based on a result of the calculation.

The brake start determination unit 62 is configured to determine whether an operation of the brake pedal 10 has been started. In other words, the brake start determination unit 62 configured to determine whether or not to start a brake control. The brake start determination unit 62 can be said as a unit with which the control unit 61 detects a timing at which a pressure increasing control is to start. When the brake start determination unit 62 determines that the operation has been started, the control unit 61 starts a brake control (liquid pressure control).

Specifically, when the reaction pressure detected by the pressure sensor 73 becomes equal to or greater than a first threshold value and then the stroke detected by the stroke sensor 71 becomes equal to or greater than a second threshold value, the brake start determination unit 62 determines that the operation of the brake pedal 10 has been started (it can be said as an operation start or a brake control start). Also, the brake start determination unit 62 is configured to use, as the stroke (value), a detection value (raw value) of the stroke sensor 71 without passing through a filter 6a. The filter 6a is a noise filter for removing noises to smoothly change a detection value. This determination is effective in a small amount of sudden operation in which the driver quickly depresses the brake pedal 10 slightly.

Figure 2:
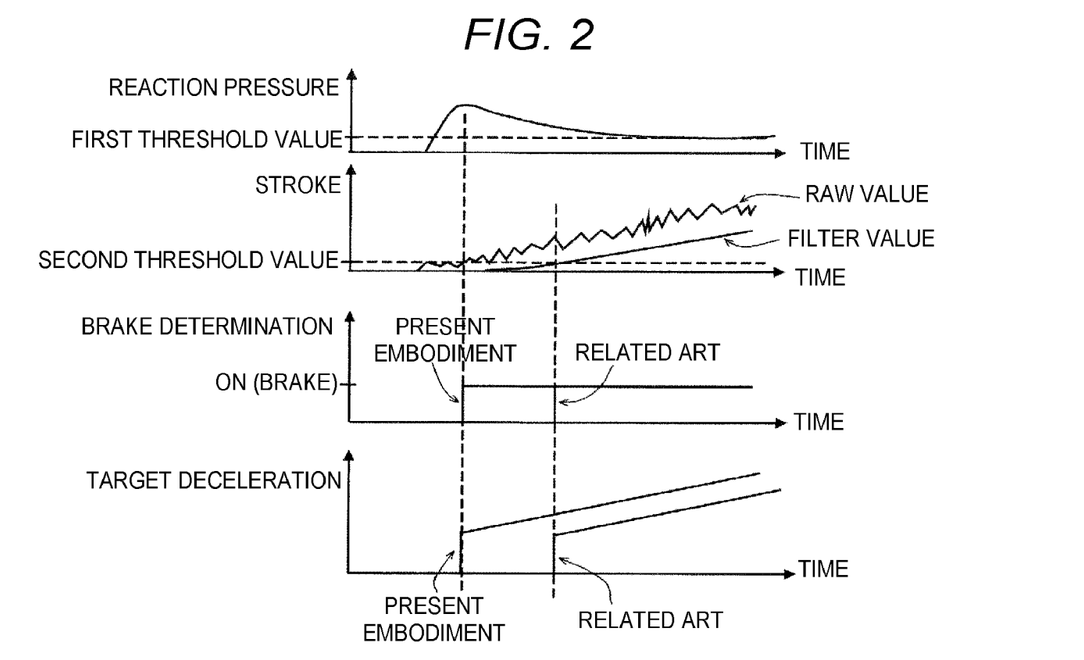
FIG. 2 is a time chart for illustrating brake start determination upon a small amount of sudden operation in the present embodiment.

According to the present embodiment, as shown in FIG. 2, when a small amount of sudden operation is performed, the reaction pressure is rapidly increased by the orifice 91. Therefore, the reaction pressure becomes equal to or greater than the first threshold value before the stroke becomes equal to or greater than the second threshold value. By the sudden brake operation, the brake liquid is rapidly supplied to the pipe 164. However, before the brake liquid is rapidly supplied to the cylinder 211 of the stroke simulator 21, the flow path is narrowed by the orifice 91 intentionally provided (or structurally formed), so that a part on an upstream side of the orifice 91 is likely to temporarily become high pressure. In the present configuration, the action of the orifice 91 is used for the determination.

Also, since the raw value of the stroke sensor 71 changes in conjunction with the further actual brake operation, it is possible to improve responsiveness to the brake operation by using the raw value as a determination element. The filter 6a is not passed, so that accuracy of a numerical value itself is reduced due to noises and the like. However, since the operation start (brake control start) is determined by an AND condition of a condition relating to the raw value and a condition relating to the reaction pressure, the accuracy (robustness) of the determination is secured. As shown in brake determination and target deceleration of FIG. 2, according to the present embodiment, it is possible to implement the brake control having high responsiveness to the driver's operation even upon the small amount of rapid operation.

More specifically, for the brake start determination unit 62, three types of determination methods including the above determination method are set. As the first determination method, the brake start determination unit 62 acquires two detection values transmitted through different wires from the stroke sensor 71, as two filter values passing thorough the filter 6a, and determines the operation start when both the two filter values become equal to or greater than a predetermined threshold value. The filter values have high accuracy because noises and the like are removed therefrom, and the determination is performed based on an AND condition of the two filter values, so that robustness is also secured. The first determination method is a determination method that is effective upon a usual brake operation (relatively gentle operation) in which the filter value is likely to follow a brake operation.

As the second determination method, the brake start determination unit 62 determines the operation start when the brake switch 72 becomes on (an operation is detected) and the reaction pressure becomes equal to or greater than predetermined threshold value. The second determination method is a determination method that is effective upon a sudden brake in which the brake switch 72 becomes on in a highly responsive manner (an operation of suddenly depressing the brake pedal to the end to stop the vehicle).

As the third determination method, as described above, the reaction pressure and one raw value of the stroke are set as the determination element. This third determination method is a determination method that is effective upon the small amount of sudden operation, as described above. The three determination methods are all determination methods in which the determination is performed based on two determination elements (AND condition). The brake start determination unit 62 determines the operation start when the AND condition is satisfied in any one of the three determination methods. In this way, the brake start determination unit 62 monitors two filter values of the stroke sensor 71, one raw value of the stroke sensor 71, the detection result of the brake switch 72, and the detection value (reaction pressure) of the pressure sensor 73, and determines the operation start, based on the elements. Thereby, it is possible to secure responsiveness and accuracy for all the brake operations.

According to the present embodiment, the reaction pressure that is influenced by the orifice 91 is used as the determination element. Therefore, for example, even upon the small amount of sudden operation to which the brake switch 72 does not respond, it is possible to improve responsiveness of the brake start determination. Also, the stroke is used as the determination element, together with the reaction pressure, so that it is possible to secure accuracy of the determination. Regarding the detection of the stroke, the determination is performed under the AND condition with the reaction pressure, so that the responsiveness can be prioritized over the accuracy. In the present embodiment, the raw value of the stroke is used, so that the responsiveness is prioritized. The raw value of the stroke directly linked with the brake operation is used, so that the responsiveness is further improved. In the meantime, the responsiveness can be prioritized by setting the second threshold value small, for example.

Other Modified Embodiments

Figure 3:
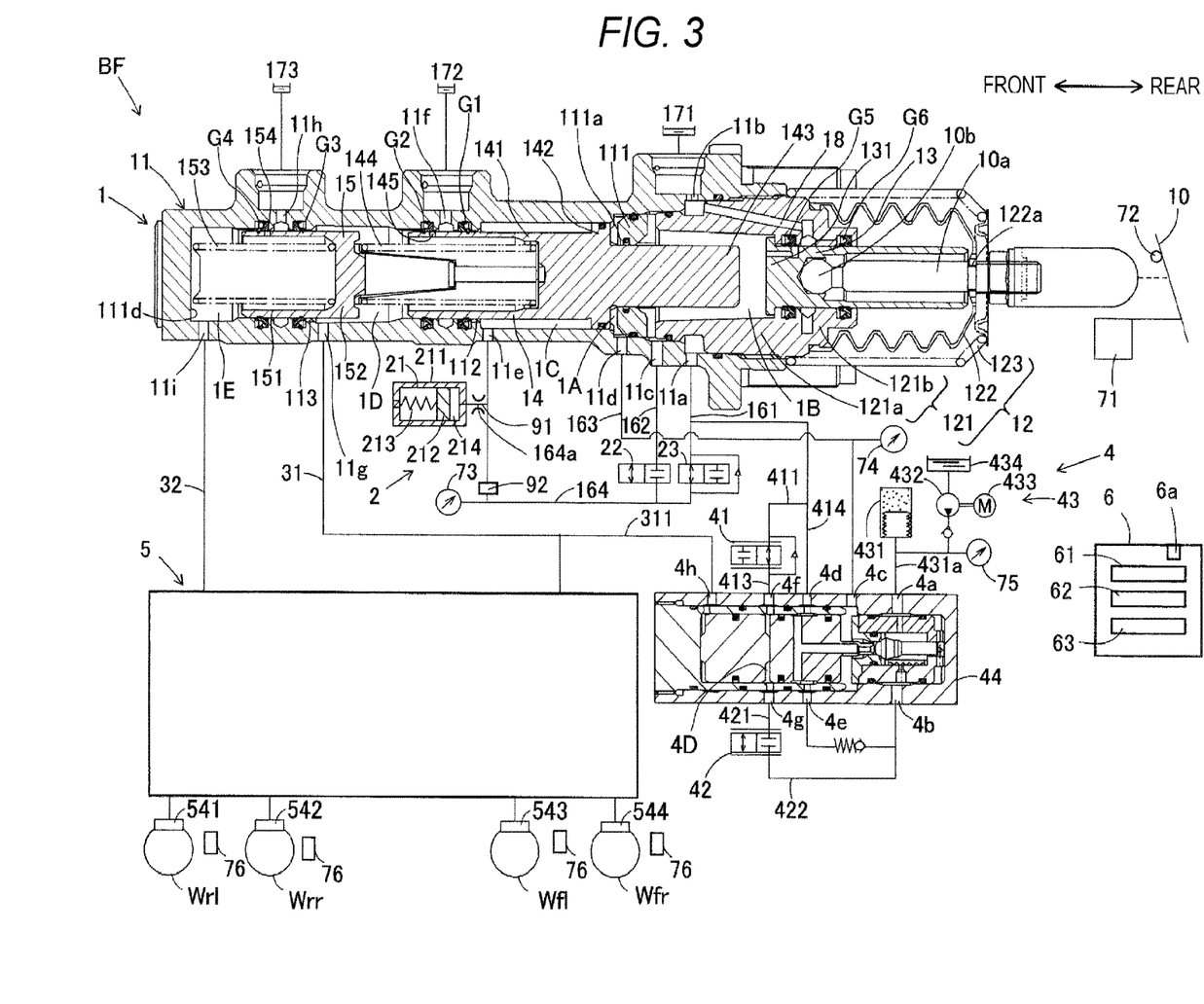
FIG. 3 is a configuration view of a modified embodiment of the vehicle brake device of the present embodiment.

The present disclosure is not limited to the above embodiment. For example, as shown in FIG. 3, the vehicle brake device BF may have an electromagnetic valve 92 provided at a part of the pipe 164 between the cylinder 211 and the pressure sensor 73. In this case, the brake ECU 6 further has an electromagnetic valve control unit 63. The electromagnetic valve control unit 63 controls the electromagnetic valve 92 so that, when a probability that the operation of the brake pedal 10 is determined to be started is high, an amount of increase in reaction pressure with respect to an amount of increase in stroke is greater, as compared to a case in which the probability is low.

The case in which the probability that the operation of the brake pedal 10 is determined to be started is high includes a case in which an inter-vehicle distance is less than a predetermined value, and the like. That is, when an inter-vehicle distance detected by a radar or the like is less than a predetermined value, it is determined that the probability is high. When the probability is high, the electromagnetic valve control unit 63 narrows a flow path of the electromagnetic valve 92 (controls the valve to a closed state), thereby increasing an orifice effect to improve a rate of increase in reaction pressure with respect to an increase in stroke. Thereby, when the probability is high, the reaction pressure is more likely to increase, so that it is possible to improve the responsiveness of the brake start determination. According to this configuration, it is possible to adjust responsiveness in accordance with traveling situations. In the meantime, the electromagnetic valve 92 may be provided to the pipe 164 (as an orifice), instead of the orifice 91.

Also, the brake start determination unit 62 may be configured so that the greater a temperature correlation value is, which correlates with a temperature of the brake liquid to generate the reaction pressure, the smaller the first threshold value is. For example, when a temperature of the brake liquid in the pipe 164 becomes higher, viscosity of the brake liquid is lowered, so that an increase in reaction pressure is likely to be slow. Therefore, when a temperature correlation value of the brake liquid is acquired by a temperature sensor or an estimation calculation and the first threshold value is changed in accordance with the value, the responsiveness is ensured more securely. The brake start determination unit 62 may reduce the first threshold value when the temperature correlation value becomes equal to or greater than a predetermined value, for example.

Also, when a change gradient of the reaction pressure becomes equal to or greater than a third threshold value, the brake start determination unit 62 may determine that the operation of the brake pedal 10 has been started, irrespective of the reaction pressure and the stroke. When the change gradient of the reaction pressure is calculated by a first numerical operation (for example, 1 or 2 operation) after the detection value of the pressure sensor 73 is acquired and the change gradient is used as the determination element, the operation start can be detected earlier than when the reaction pressure becomes equal to or greater than the first threshold value. That is, it is possible to further improve the responsiveness. For example, this determination method may be set as a fourth determination method.

Also, the actuator 5 may be a type of an actuator capable of performing pump pressurization to the wheel cylinders 541 to 544, and executing a side antiskid control. Also, the boosting mechanism is not limited to the hydraulic booster such as the servo pressure generation device 4, and may be an electric booster configured to drive a ball screw under control of an electric motor, thereby driving a master piston.

The invention claimed is:

1. A vehicle brake device comprising:
a stroke simulator including a cylinder, a piston, an orifice, and a pressure sensor, the cylinder defining a liquid pressure chamber to which a brake liquid is supplied via a fluid path in accordance with a stroke of a brake operation member, the piston being configured to slide in the cylinder by the brake liquid supplied to the liquid pressure chamber, the orifice being formed in the fluid path, and the pressure sensor being configured to detect a reaction pressure that is a liquid pressure of the brake liquid supplied to the liquid pressure chamber in a part on a supply-direction upstream side of the orifice in the fluid path, a reaction force corresponding to the reaction pressure being applied to the brake operation member by the stroke simulator;
a stroke sensor configured to detect the stroke;
a main cylinder;
an input piston;
a master piston including a pressurizing cylindrical part, a flange part, and a protrusion;
a first liquid pressure chamber defined by an inner peripheral part of the main cylinder, a rear surface of an inner wall part protruding in an inwardly directed flange shape provided on an inner periphery side of the main cylinder, an inner peripheral surface of a front portion of a cylinder part coaxially fitted in an opening on a rear side of the main cylinder, the protrusion of the master piston, and a front end portion of the input piston;
a second liquid pressure chamber defined by the inner peripheral part of the main cylinder and the master piston; and
a brake start determination unit that determines an operation of the brake operation member has been started when the reaction pressure detected by the pressure sensor becomes equal to or greater than a first threshold value and the stroke detected by the stroke sensor becomes equal to or greater than a second threshold value, the brake start determination unit uses, as the stroke, a detection value of the stroke sensor, the detection value being a value which is not passing through a filter in a small amount of sudden operation in which a driver quickly depresses a brake pedal slightly,
wherein the brake start determination unit is further configured to:
acquire two detection values transmitted through different wires from the stroke sensor, as two filter values passing through the filter, and determine the operation start when both the two filter values become equal to or greater than a predetermined threshold value upon a relatively gentle and usual brake operation, and
determine the operation start when a brake switch becomes on and the reaction pressure becomes equal to or greater than a predetermined threshold value upon a sudden brake in which the brake switch becomes on in a highly responsive manner, and
wherein the pressure sensor detects the reaction pressure in the fluid path that communicates the first liquid pressure chamber and the second liquid pressure chamber to each other.

2. The vehicle brake device according to claim 1, wherein the brake start determination unit determines that an operation of the brake operation member has been started in a case where the reaction pressure becomes equal to or greater than the first threshold value and then the stroke becomes equal to or greater than the second threshold value.

3. The vehicle brake device according to claim 1, further comprising:
an electromagnetic valve provided at a part of the fluid path between the cylinder and the pressure sensor or provided in the fluid path instead of the orifice, and
an electromagnetic valve control unit configured to control the electromagnetic valve so that, in a case where a probability that the operation of the brake operation member is determined to be started is high, an amount of increase in the reaction pressure with respect to an amount of increase in the stroke is greater, as compared to a case in which the probability is low.

4. The vehicle brake device according to claim 2, further comprising:
an electromagnetic valve provided at a part of the fluid path between the cylinder and the pressure sensor or provided in the fluid path instead of the orifice, and
an electromagnetic valve control unit configured to control the electromagnetic valve so that, in a case where a probability that the operation of the brake operation member is determined to be started is high, an amount of increase in the reaction pressure with respect to an amount of increase in the stroke is greater, as compared to a case in which the probability is low.

5. The vehicle brake device according to claim 1, wherein the brake start determination unit is configured so that the greater a temperature correlation value is, which correlates with a temperature of the brake liquid to generate the reaction pressure, the smaller the first threshold value is.

6. The vehicle brake device according to claim 2, wherein the brake start determination unit is configured so that the greater a temperature correlation value is, which correlates with a temperature of the brake liquid to generate the reaction pressure, the smaller the first threshold value is.

7. The vehicle brake device according to claim 3, wherein the brake start determination unit is configured so that the greater a temperature correlation value is, which correlates with a temperature of the brake liquid to generate the reaction pressure, the smaller the first threshold value is.

8. The vehicle brake device according to claim 4, wherein the brake start determination unit is configured so that the greater a temperature correlation value is, which correlates with a temperature of the brake liquid to generate the reaction pressure, the smaller the first threshold value is.

9. The vehicle brake device according to claim 1, wherein in a case where a change gradient of the reaction pressure becomes equal to or greater than a third threshold value, the brake start determination unit determines that the operation of the brake operation member has been started, irrespective of the reaction pressure and the stroke.

10. The vehicle brake device according to claim 2, wherein in a case where a change gradient of the reaction pressure becomes equal to or greater than a third threshold value, the brake start determination unit determines that the operation of the brake operation member has been started, irrespective of the reaction pressure and the stroke.

\* \* \* \* \*